July 6, 1954  G. FAILLA ET AL  2,683,222
RADIATION METER

Filed Aug. 23, 1951  2 Sheets-Sheet 1

INVENTOR.
GIAOCCHINO FAILLA
HARALD H. ROSSI
BY
*Roland A. Anderson*

ATTORNEY

July 6, 1954  G. FAILLA ET AL  2,683,222
RADIATION METER

Filed Aug. 23, 1951

INVENTOR
GIAOCCHINO FAILLA
HARALD H. ROSSI
BY
Roland A. Anderson
ATTORNEY

Patented July 6, 1954

2,683,222

UNITED STATES PATENT OFFICE 2,683,222

RADIATION METER

Gioacchino Failla, New York, and Harald H. Rossi, Orangeburg, N. Y., assignors to the United States of America as represented by the United States Atomic Energy Commission Application August 23, 1951, Serial No. 243,232

7 Claims. (Cl. 250—83.6)

The present invention relates to a method and apparatus for determining intensity or amount of ionizing radiation. More particularly, the present invention is directed toward providing a relatively simple radiation meter which requires no auxiliary power supply and which is capable of self-sufficient operation within a sealed chamber. The meter is capable of being made so small as to permit incorporation in a ring to be worn on the finger of a person whose hands are exposed to ionizing radiation. It is also capable of being incorporated into a relatively large apparatus capable of sensitive radiation detection.

It is an object of the present invention to provide an improved radiation meter of relatively simple and inexpensive construction.

It is another object of the present invention to provide an improved radiation meter which requires no auxiliary power supply or charge detection equipment.

It is a further object of the present invention to provide an improved, compact, sealed radiation detection apparatus which is characterized by a self-integrated operation within a sealed container.

In one of its broader aspects the objects of the present invention are achieved by providing a radiation meter comprising a radiation permeable container enclosing a conducting element, an ionizable gas in said container ambient to said element, radioactive means for changing the charge on said element, shielding means for preventing radiation from said radioactive means from acting on the gas, and means for detecting change in the charge on said element.

It is a feature of the present invention that the radioactive means for changing the charge on a conductor can be used separately to charge the electrometer of ordinary radiation detecting devices by suitable momentary contact. This is obvious since the ionization chamber parts of the devices herein described are essentially similar to those employed in commercially available radiation detectors.

A number of embodiments of the present invention are described with reference to the accompanying drawings wherein.

Figure 5:
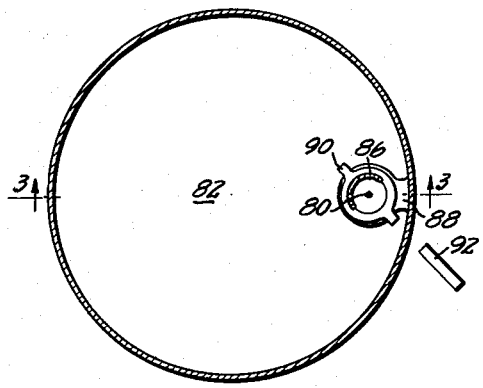
Figure 3:
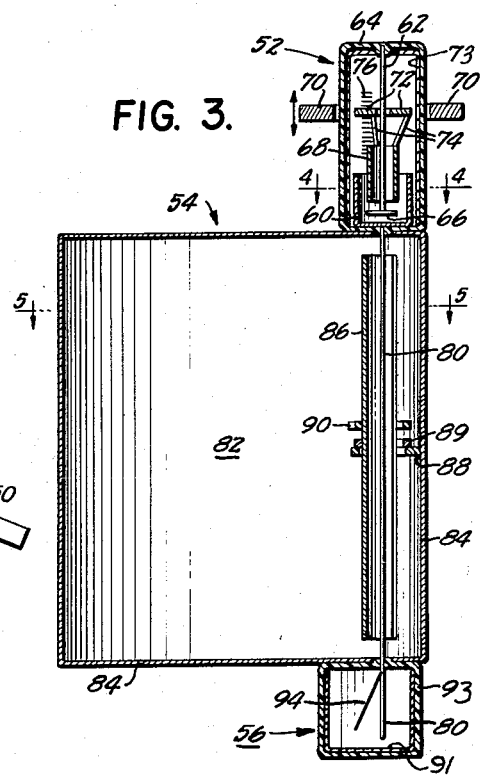
Figure 4:
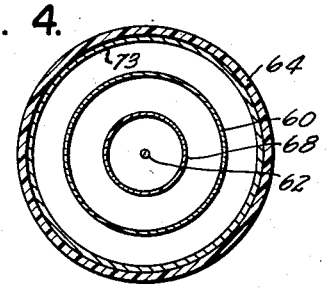

Figures 3, 4 and 5 are respectively a vertical section and two horizontal sections of a third modification of apparatus adapted to carry out a method of operation wherein the charge generated and charge dispelled by radiation are independently variable and wherein Figure 5 is taken on a line 5—5 of Figure 3 and Figure 4 is taken on a line 4—4 of Figure 3.

Figure 6:
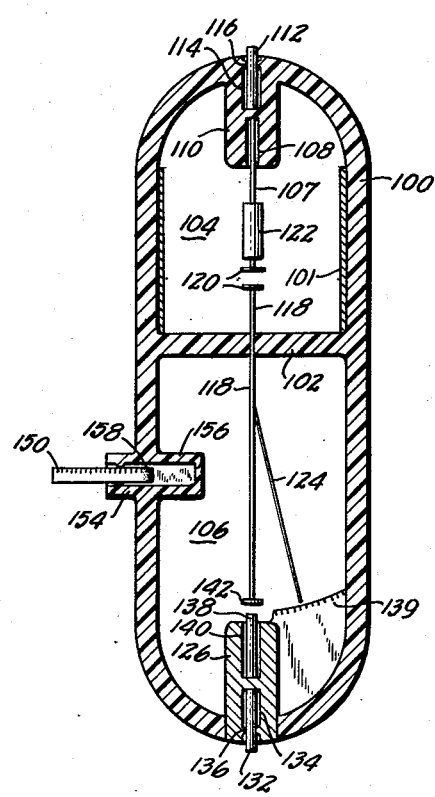

Figure 6 is a sectional view of a fourth modification including a two-chamber form of the apparatus wherein provision is made for the adjustment of the charging and discharging of the radiation detector element.

Figure 7:
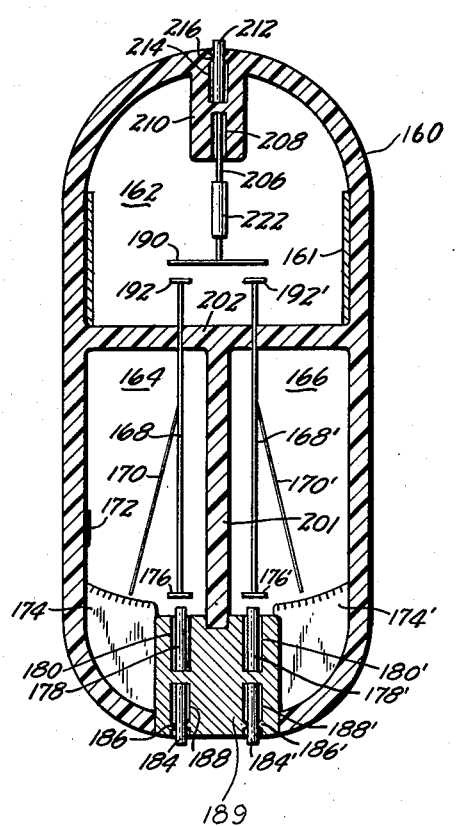

Figure 7 is a fifth modification and shows an apparatus similar to that illustrated in Figure 6 but having an independently housed timing mechanism.

Figure 1:
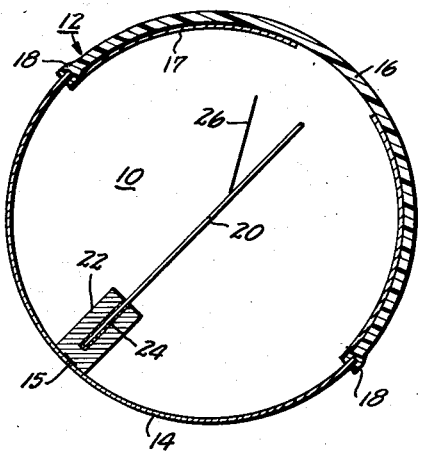
Figure 1 is a sectional diagrammatic representation of a simple one chamber form of the apparatus.

Referring particularly to Figure 1, one simple form of the apparatus comprises a chamber 10, of any suitable geometric shape, formed within an enclosure 12. The enclosure may preferably consist of a metal portion 14 and a visually transparent window containing portion 16 which may be made of plastic or other transparent material. The use of a transparent conducting plastic for the portion 16, or the coating of the internal surface of this portion with a layer 17 of a conducting substance, such as aquadag or evaporated aluminum, is desirable and serves to shield the electrometer portion 20, 26 of the apparatus from the influence of stray electric fields. It should be understood that in this, as in the other modifications described below, the plastic or transparent portion of the container is included for observational purposes. Therefore, only a portion thereof sufficient to observe the movement of an object therein, such as the electrometer filament, need be left uncoated. The metal-to-plastic joint 18 is preferably air-tight to prevent diffusion of moisture into or out of the chamber 10. Within the chamber a conducting element 20, which in this case is in rod form, is supported within a support element or electrode 22. Between the conducting element 20 and a metal support 22, a layer 24 of any suitable insulating plastic is positioned to provide an insulation between the element and its support. The metal portion 14 of the enclosure 12 and the metal support 22 may be joined as by a spot weld at 15 and in combination with the conducting surface 17 of the jacket 16 serve as one electrode of the meter, the conducting rod 20 serving as the second electrode. These elements serve as electrodes in the sense that when properly charged as described below, gaseous ions, formed by radiation penetrating the chamber 10, are separated and attracted to these elements due to the electric field existing therebetween.

At the free portion of the conducting element 20 an electrometer fiber 26 is attached so that when the rod 20 becomes charged with respect to the electrode 22, the electrometer fiber 26 is displaced from the rod 20. When the conducting element 20 is charged the apparatus is ready for use as a radiation meter. Radiation which penetrates the chamber 10 causes ionization of the gas ambient to the conducting element 20, and the charge on this element is neutralized by the attraction of oppositely charged ions to the electrode surface under the influence of the potential existing between the electrodes 20 and 14. As the potential between the electrodes is reduced, fiber 26 is displaced toward the rod and thus serves as an indication of the charge on rod 20 relative to that on the other electrode.

According to the present invention the charge which causes the initial displacement of the fiber 26 is developed on rod 20 by a suitable radioactive substance which emits charged particles and which is incorporated at the imbedded or supported end of the rod in charge changing relation. A charge changing relation is herein defined as one which causes the charged particles emitted from a radioactive substance incorporated at the imbedded or gas free end of the rod 20 to be preferentially delivered to or removed from that end of the rod. Thus, if the surface of the rod itself is coated with or consists of a radioactive material which emits beta particles for example, the rod becomes positively charged due to the loss of the negatively charged particles from the rod into the insulating plastic 24 and the metal of the surrounding support 22. By contrast, if the beta emitting radioactive material is incorporated on the surface of the plastic coated hole in the support 22 which receives the rod 20, the charge delivered to the rod is negative because the beta particles will be preferentially delivered to the rod. The maintenance of a radioactive substance in either of these or in similar functional relationships is, according to the present invention, maintenance in a charge changing relationship.

In the operation of the apparatus a charge is developed on the rod 20 by incorporating a substance in charge changing relation to the imbedded end of the rod and the charge, whether of negative or positive value, is neutralized due to the action of radiation on an ionizable gas ambient to the free end of the rod. Accordingly, if no external radiation penetrates the chamber 10 a charge is continuously built up on the rod 20 due to the decay of the radioactive source material. The support 22 is sufficiently thick to prevent radiation from the radioactive source, in charge changing relationship with the rod 20, from acting on the gas in chamber 10. If excessive radiation of external origin penetrates chamber 10 the rod becomes completely discharged and the fiber 26 shows a minimum deflection from the rod 20. Thus to completely discharge the device, it is placed in a field of strong radiation.

Figure 2:
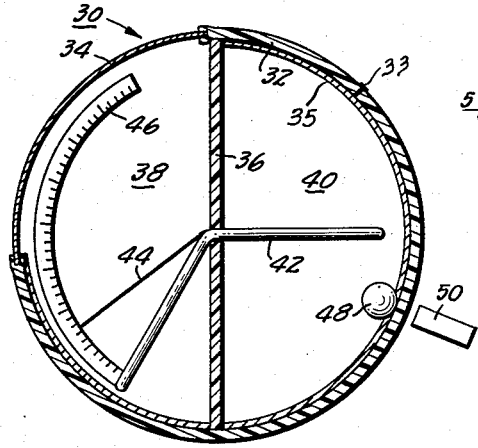
Figure 2 is similarly a sectional diagrammatic representation of a simple two-chamber form of apparatus capable of carrying out the present invention.

Having thus described the broader aspects of our invention, reference now is made to Figure 2 wherein another form of the apparatus is diagrammatically represented to include a container 30 consisting partially of a plastic wall 32 and partially of a metal wall 34. The inner surface of the curved plastic wall 32 is preferably coated with a conducting layer 35 such as evaporated aluminum or aquadag. The container is provided with a separating member 36, composed of an insulating material which divides the container 30 into two chambers 38 and 40. A conducting element 42 (similar to the rod element 20 of Figure 1) is sealed into the insulating and separating element 36 and extends into both of the chambers 38 and 40. An ionizable gas is enclosed within the chamber 38 ambient to the end of the rod 42 extending into this chamber. The end of the rod 42 extending into chamber 40 is coated with a radioactive material which emits charged particles to charge the rod as before described. Thus, for example, if the end of the rod extending into chamber 40 is coated with or has incorporated therein a radioactive material which emits beta particles the rod 42 will become charged positively due to the loss of the negatively charged beta particles therefrom. The charge on the rod does not become neutralized (as occurs in chamber 10 of Figure 1) by the action of ions within the chamber 40 because the chamber is evacuated. The radioactive material is thus maintained in charge changing relation to the rod 42. The charge thus developed on the rod 42 can become neutralized by the separation of ions formed in the chamber 38 by the action of external radiation penetrating this gas filled chamber. The insulating and separating shield member 36 also acts as a means for shielding the gas in chamber 38 from the radiation emitted from the end of rod 42 in chamber 40. It is therefore preferred to use a radioactive source which emits charged particles at relatively low energy so as to minimize the likelihood of such radiation penetrating through the shield member 36 into the chamber 38 to act on the gas therein. An ion pair formed in the gas ambient to the rod 42 in the chamber 38 will be separated by the difference in voltage between the rod 42 and the combination of the conductively coated internal curved wall of chamber 38 and the metal portion of the wall 34. The ions attracted to rod 42 in chamber 38 will tend to neutralize it. An electrometer filament 44 is attached to the rod 42 at the point where it emerges from the separating wall 36. The displacement of this filament serves to indicate the degree to which the rod 42 has become charged or discharged. A scale 46 may be used in determining the extent of travel of the filament 44 due to the change in charge on the rod 42.

One feature of the present invention relates to the use of the apparatus as a dosimeter or a device for determining the dosage of radiation which a person exposed thereto has received during a certain exposure time as for example a normal working day. If no radiation penetrates the gas filled chamber 38 the filament 44 will travel through a certain definite distance indicating a definite increase of charge in a period of time, such as eight hours. This indicates that a charge of a certain intensity is developed on the rod 42 within the eight hour period due to the emission of charged particles in the evacuated chamber 40 from the end of the rod which bears the radioactive material. Thus, for example, in an eight hour period the filament might be expected to go through 20 units on the scale 46. If, however, the filament fails to go through the 20 scale units this can only be due to the partial neutralization of the developing charge by radiation entering the chamber 38 from an external source. Thus, if the filament travels through only 16 of the expected 20 scale units during the eight hour period, the user of the radiation meter is made aware that he has been exposed to radiation from that external source and which is equivalent to the four scale units which the fiber failed to go through. The apparatus is therefore preferably calibrated to equate the scale units to radiation induced ionization so that a user may know the extent of radiation to which he has been exposed.

In order for the device to operate accurately as a radiation meter, the voltage between rod 42 and the conducting internal surface of the container 30 must be above the so-called saturation voltage. This is the voltage at which the separation of ion pairs formed in chamber 38 and their collection on the electrodes becomes independent of voltage. Below the saturation voltage there is an insufficient separating force acting on ion pairs to cause separation of each pair of ions formed. If the voltage is below saturation, some of the ions recombine without ever having reached the electrodes. Since the accuracy of the apparatus depends on the collection of a number of ions which represents the amount of ionizing radiation acting on the gas in chamber 38, a voltage dependent variation of the representative number of ions collected, such as occurs below saturation voltage, renders the device inaccurate in the low voltage range. It is therefore important in using the present apparatus that the voltage be maintained above saturation voltage during the entire period during which it is in use as a radiation dosimeter.

At the start of a time interval the voltage is preferably adjusted to a value slightly above the saturation level when using the apparatus, as described above, by a comparison of the charge which the rod 42 develops when no radiation penetrates chamber 38 during a certain time interval, and the charge developed when radiation does penetrate the chamber 38 during the same interval. Since the device is normally in a highly charged state at the start of a use period, the voltage on rod 42 may be set at a desired level by partial discharge thereof. This may be accomplished by a number of schemes. One such scheme comprises subjecting the device to an ionizing radiation of sufficient intensity to slowly discharge the device. The device is sufficiently discharged when the fiber 44 is moved to the position on the scale 46 which indicates a voltage slightly above saturation.

Another such scheme involves the use of a movable element such as 48 (see Figure 2) which may be magnetically moved along the conducting inner surface of wall 32 into contact with the rod 42. This element 48 is preferably magnetic so that its movement within the chamber may be controlled by some external means such as magnet 50. The element is composed of or completely coated with a high resistance material so that the flow of current therethrough is relatively slow.

In use the element 48 is moved along the conducting internal surface of the chamber wall 32 by external movement of the rod magnet 50 until the element makes contact with the end of rod 42. In this position it acts as a high resistance electrical connection between the rod 42 and the conducting surface. When this connection is made the charge on rod 42 starts to flow therefrom at a relatively slow rate as indicated by the movement of fiber 44 toward rod 42. When the fiber reaches the desired position indicating the saturation voltage, the magnet 50 is moved away to break the high resistance connection between the rod and conducting surface. A grounding lead 33, which is simply a conducting element sealed through the wall 32, permits external grounding contact to be made through any suitable conductor, not shown, with the conducting surface layer 35 coated on the interior of wall 32 and thence with the element 48.

Referring now to Figures 3, 4 and 5 still another form of the apparatus is illustrated. This apparatus is divided into three substantially separate portions, a charging portion 52, a discharging portion 54, and a charge indicating portion 56. Charging portion 52 is seen as an enlarged horizontal section in Figure 4 (taken on the line 4—4 of Figure 3) and the discharging section is seen in horizontal section in Figure 5 (taken on the line 5—5 of Figure 3).

With particular reference to the charging portion 52 of Figure 3 and to Figure 4, charge is developed on a cup-like element 60 by impingement of charged radioactive particles emitted from a radioactive substance incorporated on the lower end of a rod 62. The upper end of the rod 62 is supported in the plastic housing 64 which defines the chamber of the charging portion 52. The internal vertical and top surfaces of this housing are preferably coated with a layer 73 of a conducting substance but the lower surface is free of conducting material so that the cup 60 is insulated from the other conductors in charging portion 52. A vacuum is maintained in the chamber formed by enclosure 64 to prevent the formation of ions therein. The lower end of the rod 62 terminates axially in a horizontally disposed plate 66. This plate serves as a shield to prevent radiation emitted from the surface of the rod 62 from passing downward into contact with the lower surface of the cup 60. The number of charged particles emitted from the surface of rod 62 which are permitted to pass in a radial direction to impinge on the vertical walls of cup 60 is regulated by the raising or lowering of the shielding collar 68. Raising and lowering of this collar is accomplished by raising and lowering the externally adjustable magnet element 70. The positioning of the external magnet element 70 effects the positioning of an internal magnet element 72. This internal magnet is attached to the collar 68 by the struts 74 and thus adjustment of the position of collar 68 may be accomplished by adjustment of the position of magnet 70. A scale 76 inscribed on the container 64 enables the position of internal magnet element 72 and thus of the collar 68 to be accurately determined. The charge developed on the cup 60 is not discharged by the flow of ions formed within the container 64 by the action of penetrating radiation because the gas has been removed therefrom and no ions can be formed.

The relative radial positioning of the component elements in the lower portion of this charging device 52 may be seen with reference to Figure 4 which is an enlarged section taken on the line 4—4 of Figure 3. In order of decreasing diameter the elements are: the container wall 64; the wall of the cup 60, disposed concentrically within container 64; the collar 68, positioned concentrically in separating position between cup 60 and the radioactive source 62 of charged particle radiation. Referring again to the charging portion 52 of Figure 3 the flow of charged particle radiation to the cup 60 may be entirely cut off by lowering the collar until it makes contact with the horizontal shield plate 66. In operation the collar 68 is raised by raising a magnet 70 thereby causing a charge to build up on the cup 60. When a sufficient charge has been developed on the cup 60 the collar 68 is again lowered by lowering magnet 70 thus shutting off the flow of charged particles from the rod 62 and leaving the cup 60 charged to a desired potential.

Turning now particularly to the discharging portion 54 of the apparatus illustrated in Figure 3 and to Figure 5, it is seen that the rod 80 makes electrical contact with cup 60 through the lower insulating wall of the container 64. The rod 80 extends through an enlarged chamber 82 formed within a cylindrical container 84. Rod 80 is eccentrically placed with respect to the cylindrical container. The chamber 82 is essentially an ionization chamber, rod 80 forming one electrode and the conducting container wall 84 acting as the other electrode. The number of ions formed within the chamber which are collected on the charged rod 80 may be varied by shifting the position of a curved channel shield member 86. The shield member 86 is mounted vertically with its channel portion longitudinally confronting the rod 80 along most of the rod length. The channel is supported in the chamber 82 by a ring element 89, which is welded to channel 86 and rests on the ring support 88. This support 88 extends from and is welded to the internal side wall 84 of the ionization chamber.

Acting together the rings 88 and 89 permit the channel 86 to be rotated about the rod 80. Positioning of the shield 86 at various positions around the rod 80 may be brought about by the co-action of a magnet 90, attached to the channel member 85, and an externally manipulated magnet such as a bar magnet 92 (see Figure 5). A shift of the position of the external magnet causes a corresponding shift of the internal magnet and consequently of the channel 86. By reversing the pole of the bar magnet 92 externally of the container 84 the channel may be made to turn through 180° and this turning, in combination with the turning induced by disposing bar magnet 92 at positions around the vertical wall of the container 84, makes it possible to position the channel as desired. The position of the channel with respect to the container 84 is important in that it determines the percentage of the ions formed in chamber 82 which are collected on the charged rod 80. Most of the ions attracted toward the rod 80 from a position in chamber 82 which is separated from the rod by the shield, never reach the rod but impinge on the ion shield and are neutralized thereon. The shield serves to intercept and discharge ions attracted toward rod 80 from positions aligned with the charged rod and grounded shield. Only the ions attracted from the portion of the gas in chamber 82 to which rod 80 is exposed are able to act on the rod to discharge it.

When the shield is positioned between the rod and a small volume of gas as for example to the right of rod 80 only a comparatively small number of ions are intercepted because only a small number of ions are formed in the small volume of gas in this portion of chamber 82. In this position the apparatus is highly sensitive to radiation because a large portion of the ions formed are able to reach the rod and give up their charge in neutralizing it. On the other hand, if the shield is shifted to a position between the rod and a larger volume of gas, as in the position shown, a larger proportion of ions are intercepted and the sensitivity of the apparatus is lowered. The sensitivity of the apparatus may be increased or decreased by changing the position of the channel 86 to positions around the charged rod 80 so that more or fewer ions are intercepted by the channel. Generally the larger the number of ions intercepted the lower will be the sensitivity of the apparatus.

The detector portion 56 of the apparatus is simply an electrometer consisting (in Figure 3) of an extension of the rod 80 into a plastic housing 93 and a filament 94 attached to the rod 80 and capable of moving within the container 93 to give an indication of the charge on the rod 80. The container 93 is plastic but is coated on its internal vertical and lower end surfaces with a layer 91 of a conducting material. At least a portion of the plastic wall 93 serves as a transparent window portion for viewing indicator 94. A scale such as that included in chamber 38 of Figure 2 may be incorporated in the detector 56.

Referring now specifically to Figure 6 there is shown a device which is essentially a modification of the apparatus of Figure 2. A plastic jacket 100 encloses a chamber which is divided internally by the separating plastic wall 102 into an evacuated chamber 104 and a gas filled chamber 106. Charge is developed within the evacuated chamber analogously to that developed in chamber 40 of Figure 2 and chamber 106 acts as an ionization chamber similar to chamber 38 of Figure 2. In the charging chamber 104 a radioactive substance emitting charged particle radiation is borne on the upper end of a movable rod element 107. The lower portion 122 of the rod 107 is a high resistance element the function of which is described below. The lower end of rod 107 terminates in an abutment 120 which corresponds to a similar abutment 120 formed at the upper end of a second rod 118 which is mounted in stationary position.

It is preferred that the end 120 of rod 107 be relatively small (though diagrammatically illustrated as large for the sake of clarity) compared with the upper end of the same rod. The reason is that a charge is collected on rod 107 and stored thereon. It is desired that this charge be delivered to the rod 118 at a relatively slow rate. In order to deliver the charge to rod 118 slowly it must pass through the resistance 122. Thus it is preferred that the principal portion of the charge be stored on the upper end of rod 107. In this connection rod 107 serves as one plate of a condenser. The other plate of the condenser is formed by coating the vertical internal walls of chamber 104 with a layer 101 of a conducting substance such as aquadag or a metallized coat such as evaporated aluminum. A simple condenser arrangement is provided by inserting rod 107 into an insulated recess in an internally projecting plastic element 110 and coating the vertical outer surface thereof with a conducting substance such as those disclosed above. The rod 107 is positioned within the upwardly extending recess 108 which opens at the lower surface of the internally projecting element 110. The internal surface of the recess and the lower surface of the projection 110 are free of conducting substances so that no electrical connection may occur between the rod 107 and the conducting vertical surfaces within the chamber 104. The relative dimensions of the projection 110 and rod 107 are shown to illustrate their relative position within the chamber 104 but it will be understood that their relative diameters and lengths may be altered to favor the provision of a relatively high capacitance between rod 107 and the conducting surface on the vertical outer surface of the projection 110.

In order to connect and disconnect the rods 107 and 118 at the desired times the magnetic attraction of a relatively strong permanent magnet rod 112 is employed. A downwardly extending externally opening recess 114 which is axially aligned with recess 108 is provided at the upper end of container 100. The rod 107 is also composed at least in part of a magnetic material so that rod 107 is capable of being attracted into and retained in the recess 108 by the action of the magnet rod 112. Rod magnet 112 is maintained within recess 114 by the pressure clip 116. Thus in the upper or charging portion of the device illustrated in Figure 6 a rod element 107 bearing a radioactive material in charge changing relationship is provided in charge deliverable relationship to a second rod element 118.

With reference now particularly to the lower portion of Figure 6 it is seen that the rod 118, which may be charged at a relatively slow rate by causing rod 107 to be lowered into contact therewith, is sealed in insulated relation through the separating wall 102 and extends into both the charging chamber 104 and ionization chamber 106. As the charge is delivered to the rod 118 a filament indicator 124 is displaced away from the rod 118 to positions along a scale 139. At least a portion of wall 100 is transparent to facilitate viewing the scale 139 and indicator filament 124. The rod 118 forms one plate of a condenser in the ionization chamber 106. The other plate consists of a conductive coating on the internal vertical walls of the lower portion of container 100 and the conducting element 126. Ionizing radiations which penetrate chamber 106 cause ionization of the gas therein and the ion pairs formed by the radiation are separated by the electrical field existing between the rod 118 and the conducting vertical surface within the chamber 106. The extent of the discharge of rod 118 due to the attraction of ions thereto is indicated by the displacement of the filament 124 along the scale 139 toward the rod. If no radiation penetrates the chamber 106 the filament 124 remains stationary.

A discharge of the rod 118 may be induced by placing a radioactive source in close proximity to the chamber. Thus, for example, if the rod 118 has become too highly charged a source 158 of ionizing radiation at the end of a ruled rod 150 may be inserted into a recess 154, specially provided for this purpose in one wall of the container 100, and the radiation from this source 158 used to partially discharge the rod 118. For this purpose the internal wall 156 of the recess 154 should preferably be thin to permit the radiation from the source 158 to penetrate into chamber 106 without undue loss of particle energy.

Another way in which the source 158 is useful in connection with the present device involves the establishment of a balance of the development of charge on rod 118 and the ionic discharge of the rod. For this purpose electrical contact is maintained between the two abutting ends 120 of the rods 107 and 118. A charge will thus be constantly delivered to rod 118 at a rate which depends on the value of the resistance 122. If the active end of rod 150 is inserted in the recess 154 and its position therein properly adjusted, an ion current may be developed in the chamber 106 which exactly offsets the current delivered from the radioactive source on rod 107. This is in effect a zero position on the scale of rod 150. If the rod is maintained at this zero position and external ionizing radiation penetrates the chamber, the fiber will drift to the left because the ionization due to this external radiation will be added to the ionization due to the beta source on rod 150. To eliminate this drift the rod 150 can be partially withdrawn from its zero position. The required amount of retraction of the rod 150 from the recess 154 will depend on the intensity of the external radiation field. The scale of rod 150 may be calibrated in terms of incident external radiation of known intensity so that determinations may be made of radiation of unknown intensity by retracting the rod from its zero position until the fiber 124 becomes stationary for the particular radiation being determined.

If it is desired to completely discharge the rod 118 or to deliver a charge thereto from an external source, electrical contact can be made between the rod 118 and the exterior of the device by inverting the device and withdrawing a magnet rod 132 from a recess 134 in a non-magnetic metal block 126. The block is sealed into the wall 100 of the device to project internally into chamber 106. The butt end 142 of the rod 118 receives the conducting magnetic rod 138 as it falls from the recess 140 in the metal element 126. When the device is in the position shown the press seal 136 keeps the rod 132 in place. From the foregoing it is apparent that there are several alternate means for charging and discharging the ion collecting electrode 118 contemplated by the present invention and for regulating the rate of charge or discharge thereof.

Referring now specifically to Figure 7, a device similar to that shown on Figure 6 will be described. The container 160 is in this case divided by two internal walls 202 and 201 into three separate chambers. The wall 202 divides the container into an upper charging chamber 162 similar to that charging chamber 104 of Figure 6, and a lower portion, while the vertically disposed wall 201 divides the lower portion of the container into the two chambers 164 and 166. With reference to the upper chamber 162, the source of charged particle radiation is borne by the upper end of the movable rod 206. A relatively high resistance 222 divides the rod 206 into an upper charge developing and charge retaining portion and a lower conductor portion 190 which simply acts to carry the charge which passes through the resistance 222 to the butt ends 192 and 192' of the stationary rods 168 and 168' respectively. The upper end of the rod 206 may be retained within a recess 208 in an internally projecting support 210 by the magnetic attraction of a rod magnet 212. The rod magnet 212 is similarly positioned within a recess 214 and retained therein by the pressure clamp 216. The internal vertical walls of the chamber 162 are coated with a layer 161 of a conducting substance but the horizontal walls including the lower surface of the internal projection 210 and the top surface of the wall 202 remain free from conducting material and in fact serve as insulating spacers to keep the charge from passing from the rods 206, 168 and 168' to the conducting internal vertical walls of the device. Thus, the device may be described as a condenser wherein the rods serve as one set of similarly charged plates and the conducting surfaces on the vertical walls act as the other set of plates.

Chamber 164 is intended to serve as a timing mechanism as it is used in connection with the present invention. The timing mechanism serves to render the device independent of separate timing devices so that the user may know the rate at which he has been subjected to the action of ionizing radiation without reference to a separate timing device. It will be seen that the chamber 164 is essentially a mirror image of the chamber 166 except for the inclusion of a radioactive source 172 on one wall of the chamber 164 and therefore the description with reference to the elements of the left hand chamber is equally applicable to the right hand chamber where like elements are indicated by like numerals with a super prime added. Thus with reference to chamber 164 the chargeable rod 168 is sealed in insulated relation in the dividing wall 202. The charge on the rod 168 is indicated by the position of the filament with respect to the scale 174. At least a portion of the wall 160 is transparent to permit viewing of this filament 170 and scale 174. Electrical connection may be made between the rod 168 and the device exterior by inversion thereof and removal of the permanent magnet rod 184 from a recess 186 provided for the purpose in a metal block 189. This causes the rod 178 to fall from its recess 180 into contact with the butt end 176 of rod 168 and make electrical contact therewith. The non-magnetic conducting block 189 connects the rod 178 with the device exterior. If it is desired to completely ground the rod 168, this may be accomplished by grounding the block 189, or if it is desired to charge the rod 168, this may be accomplished by correspondingly applying a charge to the block.

In order to use the device so as to determine not only the amount of ionizing radiation to which the user has been exposed but also the interval during which the exposure took place, the two rods 168 and 168' are charged to equal potentials. This may be accomplished very simply by dropping the charged rod 206 from its recess 208 in the support projection 210 by removing the magnetic rod 212. Rods 168 and 168' become equally charged because electrical connection is made therebetween by the conductor 190. When the rod 212 is replaced in its recess 214 the rod 206 is retracted into its recess 208 and the two rods 168 and 168' are left equally charged. The radioactive source 172, which is preferably a relatively weak emitter of low energy charged radiation, causes ionization of the gas within the chamber 164 but is without effect on the gas in chamber 166. This ionization in chamber 164 acts to discharge the element 168 and the fiber 170 is displaced to the right along scale 174. The initial charging of the rods 168 and 168' is preferably high since no additional charge is delivered to the rods during the exposure period. The rate of discharge is constant when the charge on the rod 168 is above the critical voltage because a constant ion current is produced in the gas in chamber 164. The displacement of the fiber 170 across the scale 174 is thus easily convertible into time. The displacement of fiber 170 will cause a relative difference in the positions of the fibers 170 and 170' with respect to the scales 174 and 174'. This relative difference in displacement due to the additional ionization in chamber 164 continues to occur even when the chambers are exposed to external radiation because each chamber is equally subjected to the incident radiation but only chamber 164 is subjected to ionization from source 172.

It is apparent from the foregoing that the present invention provides a relatively simple though versatile radiation meter. The form of the meter may be adapted to making radiation measurements over a relatively wide intensity and time range. A single instrument may incorporate provision for adjusting the sensitivity of the device by adjustment of the amount of charge developed, the rate of charge delivered to the ionization detecting electrode or the auxiliary discharging schemes so that a wide range of measurements may be made. The device is also operable without the aid of auxiliary power supplies and may be hermetically sealed to minimize the effects of the atmospheric gases. The embodiments described with reference to the accompanying drawings are intended to be illustrative of the numerous forms in which the device may be produced and it is therefore to be understood that the concept of the present invention is not limited to the illustrative embodiments shown.

We claim:

1. A self-contained radiation meter which comprises a hermetically sealed envelope having a visually transparent wall portion, at least a portion of the internal surface of said envelope being conductive, a chargeable element mounted wholly within said envelope in insulated relation thereto, at least a portion of said element being maintained in contact with an ionizable gas, a source of charged particle radiation disposed within said envelope in charge-changing relation to said element, shielding means shielding said source and preventing radiation emitted by said source from acting on said gas, and a charge indicator on said chargeable element.

2. A self-contained radiation meter which comprises a hermetically sealed envelope having a visually transparent wall portion, at least a portion of the internal surface of said envelope being conductive, said envelope being separated by a dividing wall into a gas-filled and an evacuated chamber, a chargeable element mounted wholly within said envelope in insulated relation in said dividing wall and extending into each of said chambers, a radioactive source disposed within said envelope in charge-changing relation with the portion of said element which extends into the evacuated chamber, a charge indicator on said element, said dividing wall serving to shield the gas in said gas-filled chamber from the radiation from said radioactive source.

3. A self-contained radiation meter which comprises a hermetically sealed envelope having a visually transparent wall portion, at least a portion of the internal surface of said envelope being conductive, a chargeable element mounted wholly within said envelope in insulated relation and at least a portion of said element being maintained in contact with an ionizable gas, a source of charged particle radiation disposed within said envelope in charge-changing relation to said element, means for regulating the rate of change of charge on said element, shielding means shielding said source and preventing radiation emitted from said source from acting on said gas, and a charge indicator on said chargeable element.

4. A self-contained radiation meter which comprises a hermetically sealed envelope having a visually transparent wall portion, at least a portion of the internal surface of said envelope being conductive, a dividing wall separating said envelope into a gas-filled and an evacuated chamber, a chargeable element mounted wholly within said envelope in insulated relation in said dividing wall and extending into each of said chambers, a source of charged particle radiation disposed within said envelope in charge-changing relation to said element, said dividing wall serving to shield the gas in said gas-filled chamber from the radiation from the radioactive source, a charge indicator on said chargeable element, and ion intercepting means proximate to the extension of said element in said gas-filled chamber and adapted to be moved to regulate the proportion of ions formed in said gas-filled chamber which are collected on said element.

5. A self-contained radiation meter which comprises a hermetically sealed envelope having a visually transparent wall portion, at least a portion of the internal surface of said envelope being conductive, a dividing wall separating the chamber within said envelope into a gas-filled and an evacuated chamber, a first conducting element mounted wholly within said envelope in said dividing wall in insulated relation thereto and extending into each of said chambers, a second conducting element mounted wholly within said envelope in electrically connectable relation to said first element, a source of radiation in charge-changing relation with said second conducting element, means for connecting said first and second elements and means for indicating the charge on said first element, said dividing wall serving to shield the gas in said gas-filled chamber from the radiation from said radioactive source.

6. A self-contained radiation meter which comprises a hermetically sealed envelope having a visually transparent wall portion, at least a portion of the internal surface of said envelope being conductive, a dividing wall separating the chamber enclosed by said envelope into a gas-filled and an evacuated chamber, a first conducting element mounted wholly within said envelope and sealed through said dividing wall in insulated relation thereto and extending into each of said chambers, a second conducting element mounted wholly within said envelope in insulated relation thereto, externally operable means for connecting said first and second elements, a source of radiation disposed within said envelope in charge-changing relation with said second conducting element, said dividing wall serving to shield the gas in said gas-filled chamber from the radiation from said radioactive source, means for regulating the rate of flow of current from said second element to said first element when connection is made therebetween, externally operable means for discharging said second element and means for indicating the charge on said second element.

7. A self-contained radiation meter which comprises a hermetically sealed envelope having a visually transparent wall portion, at least a portion of the internal surface of said envelope being conductive, a dividing wall separating the volume enclosed by said envelope into two gas-filled chambers and one evacuated chamber, a first conducting element mounted wholly within said envelope and sealed through said dividing wall in insulated relation thereto between the first gas-filled chamber and the evacuated chamber, a second conducting element mounted wholly within said envelope and sealed through said dividing wall in insulated relation thereto between the second gas-filled chamber and the evacuated chamber, a third conducting element mounted wholly within said envelope in said evacuated chamber in insulated relation to the conducting internal surface and in electrically connectable relation to said first and second elements, a source of charged particle radiation disposed within said envelope in charge-changing relation to said third conducting element, at least a portion of said dividing wall serving to shield the gas in said gas-filled chambers from the radiation from the source, means for regulating the rate of flow of current from the third conducting element to the first and second elements and a source of radiation in the first gas-filled chamber.

References Cited in the file of this patent

UNITED STATES PATENTS

| Number | Name | Date |
| --- | --- | --- |
| 1,059,095 | Whitehead | Apr. 15, 1913 |
| 2,168,464 | Yeda | Aug. 8, 1939 |
| 2,490,298 | Ghiorso | Dec. 6, 1949 |
| 2,610,302 | Christian | Sept. 9, 1952 |